United States Patent
Myrah et al.

(10) Patent No.: US 9,069,470 B2
(45) Date of Patent: Jun. 30, 2015

(54) ZONE GROUP REASSIGNMENT USING STORAGE DEVICE SIGNATURES

(75) Inventors: Michael G Myrah, Cypress, TX (US); Balaji Natrajan, Houston, TX (US); Sohail Hameed, Houston, TX (US); Lijun Qin, College Station, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 923 days.

(21) Appl. No.: 13/078,449

(22) Filed: Apr. 1, 2011

(65) Prior Publication Data
US 2012/0254553 A1 Oct. 4, 2012

(51) Int. Cl.
G06F 3/06 (2006.01)
H04L 29/08 (2006.01)

(52) U.S. Cl.
CPC .......... *G06F 3/0607* (2013.01); *H04L 67/1097* (2013.01); *G06F 3/0635* (2013.01); *G06F 3/067* (2013.01)

(58) Field of Classification Search
USPC ........................................................ 709/222
See application file for complete search history.

(56) References Cited

U.S. PATENT DOCUMENTS

| | | | |
|---|---|---|---|
| 7,216,188 B2 | 5/2007 | Reid et al. | |
| 7,377,800 B2 | 5/2008 | Gasser | |
| 7,444,437 B2 | 10/2008 | Shidada | |
| 7,539,799 B2 | 5/2009 | Ashmore et al. | |
| 2005/0108476 A1* | 5/2005 | Tanaka et al. | 711/114 |
| 2008/0075103 A1* | 3/2008 | Noble et al. | 370/429 |
| 2008/0155169 A1* | 6/2008 | Hiltgen et al. | 711/6 |
| 2009/0083484 A1* | 3/2009 | Basham et al. | 711/114 |

* cited by examiner

*Primary Examiner* — Kevin Bates
*Assistant Examiner* — Nazia Naoreen
(74) *Attorney, Agent, or Firm* — Hewlett-Packard Patent Department

(57) ABSTRACT

A method and apparatus for assigning zone groups to a storage enclosure is disclosed. When a storage enclosure is added to a switch in a fabric, a signature of the storage enclosure will be created from the storage devices loaded in that enclosure. The signature will then be compared against the signature from a storage enclosure that is offline. When the signature matches the signature of the offline storage enclosure, the zone groups from the offline storage enclosure will be copied to the storage enclosure that was added to the fabric.

14 Claims, 2 Drawing Sheets

US 9,069,470 B2

ZONE GROUP REASSIGNMENT USING STORAGE DEVICE SIGNATURES

BACKGROUND

Servers use and store large amounts of data. The data is typically stored on non-volatile media, for example hard drives and tape libraries. Many servers, for example blade servers, use hard drives mounted in storage enclosures to save their data. A storage enclosure is a device containing the infrastructure to support a plurality of hard drives inserted into its drive bays or slots. The infrastructure may contain a storage controller that provides power and signal connections between the drive bays and a fabric coupled to the servers. Each storage enclosure may contain a large number of hard drives. Each storage enclosure may be coupled to multiple servers through the fabric. The hard drives can be configured into different sets or groups, called zone groups, such that the drives in one set or group may not be visible to some servers coupled to the fabric.

Occasionally a storage enclosure may fail. The drives in the storage enclosure may still be functional and may contain large amounts of data. Re-creating the failed storage enclosure using a new storage enclosure with all new drives may take a significant amount of time due to the large amounts of data that would need to be copied from a backup data source. Therefore the still functioning hard drives are typically moved into a new storage enclosure. In this way the data contained on the old disk drives can be accessed through the new storage enclosure. Unfortunately, in doing so, the different sets or zone groups the hard drives had been a part of will be lost.

DETAILED DESCRIPTION

Figure 1:
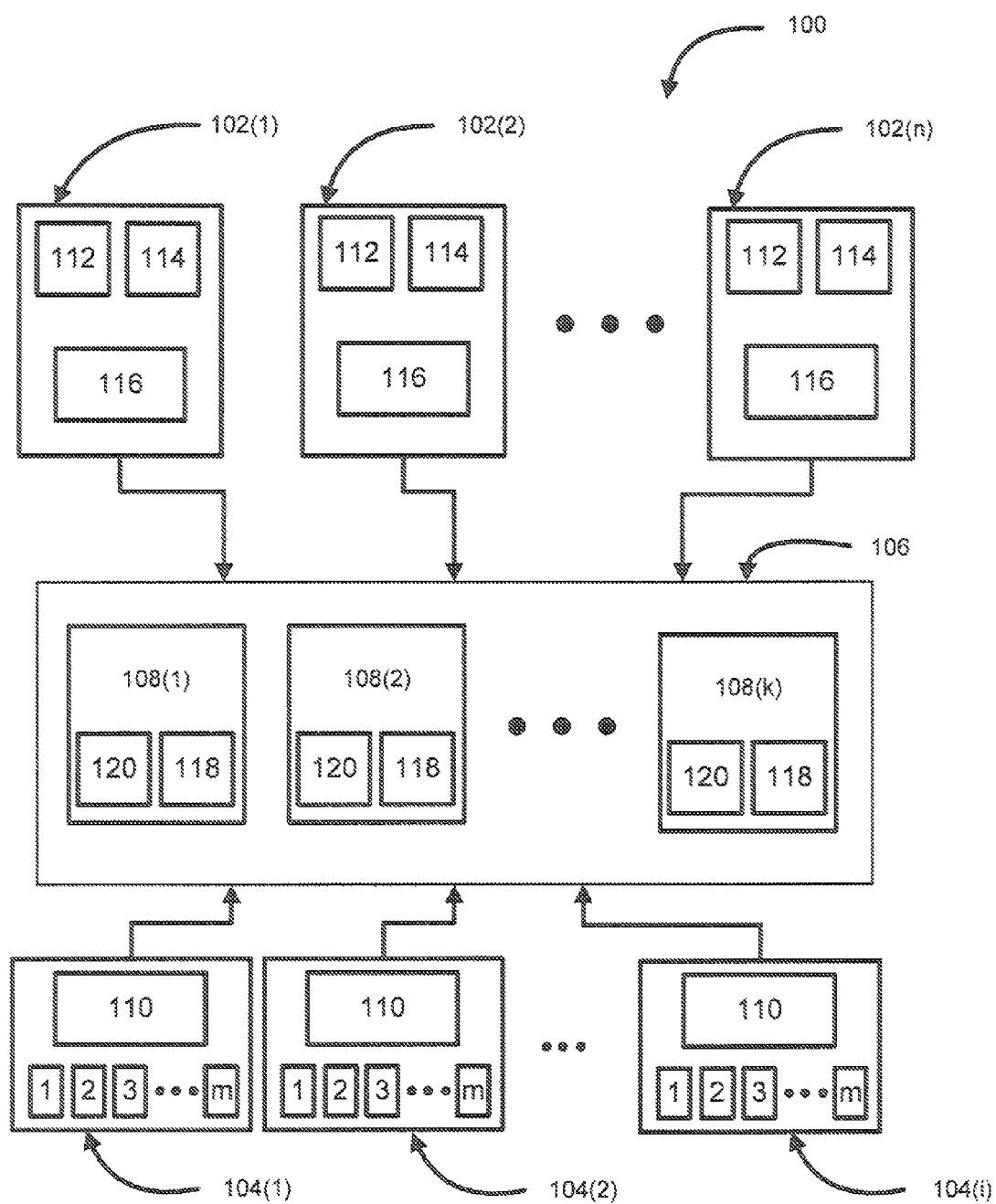
FIG. 1 is a block diagram of a data center 100 in an example embodiment of the invention.
Figure 2:
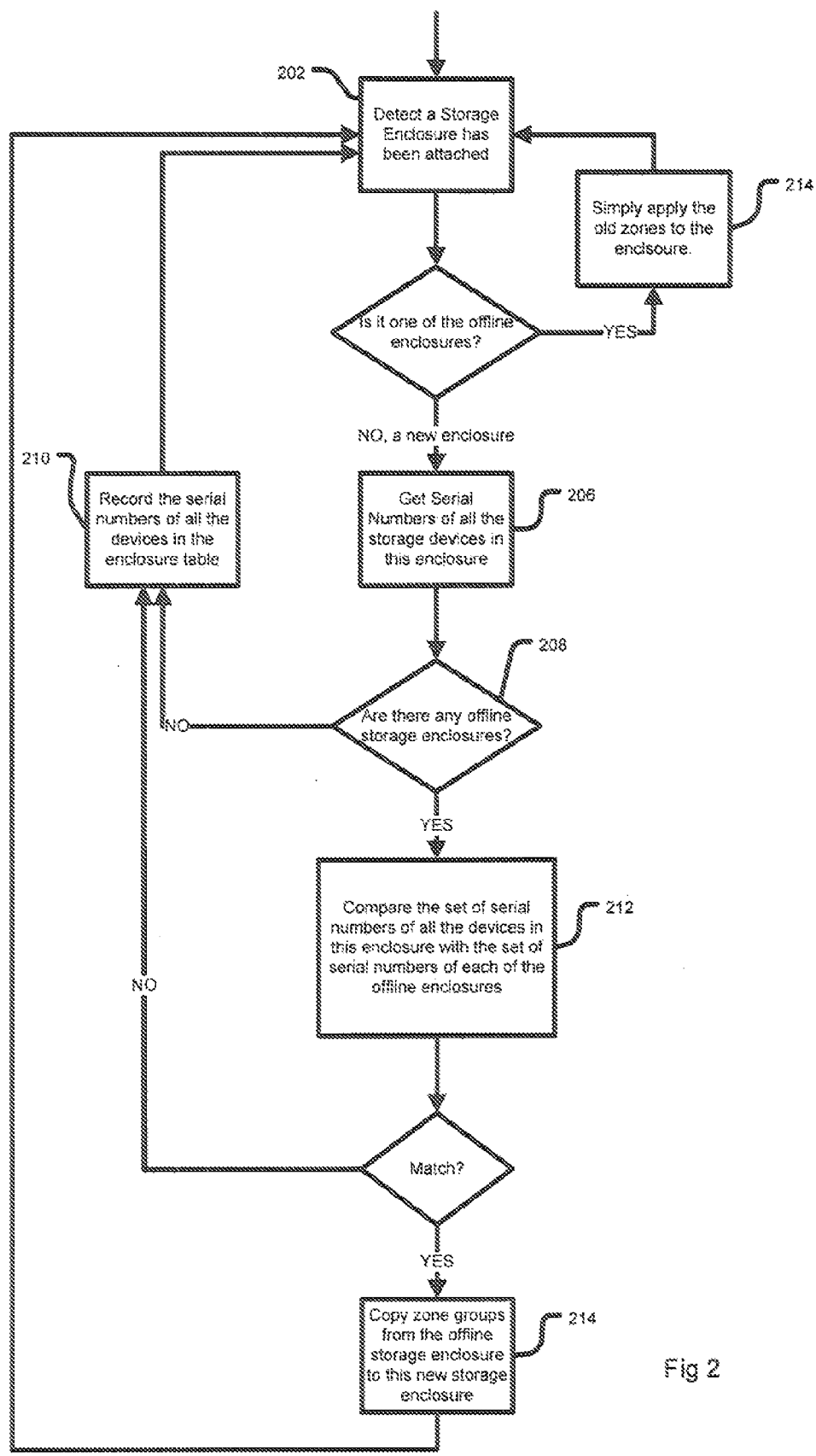
FIG. 2 is a flow chart for adding a storage enclosure to a fabric in an example embodiment of the invention.

FIGS. 1-2, and the following description depict specific examples of the invention. For the purpose of teaching inventive principles, some conventional aspects have been simplified or omitted. Those skilled in the art will appreciate variations from these examples that fall within the scope of the invention. The features described below can be combined in various ways to form multiple variations of the invention. As a result, the invention is not limited to the specific examples described below, but only by the claims and their equivalents.

FIG. 1 is a block diagram of a data center 100 in an example embodiment of the invention. Data center 100 comprises a plurality of servers 102(n), a fabric 106, and a plurality of storage enclosures 104(i). The plurality of servers 102(n) may be rack mounted servers, blade servers, standalone servers, or some combination thereof. Each of the plurality of servers 102(n) comprises of one or more processors 112, memory 114 and an I/O controller 116. Each of the plurality of servers 102(n) is coupled to fabric 106.

Fabric 106 comprises a plurality of switches 108(k). The plurality of switches 108(k) couple the plurality of servers 102(n) to the plurality of storage enclosures 104(i) such that each server may access each of the plurality of storage enclosures 104(i). Each of the plurality of switches 108(k) comprises of logic 120, memory 118, and a plurality of input and output ports. Servers 102(n) are coupled to the plurality of input ports and storage enclosures 104(i) are coupled to the plurality of output ports. Logic 120 controls the access between the servers and the storage enclosures by controlling access between the plurality of input ports and the plurality of output ports. Logic may be hardware or a hardware software combination, for example a micro-processor executing code, a processor executing code, an application specific circuit (ASIC), or the like. Memory 118 has at least some non-volatile portion, for example NVRAM. In one example embodiment of the invention, switches 108(k) may be serial attached SCSI (SAS) switches. SAS switches may also be known as SAS expanders.

Each storage enclosure 104(i) comprises infrastructure 110 and a plurality of storage bays or slots 1-m. At least one storage device is mounted into one of the plurality of storage bays. A storage device is a non-volatile memory device, for example, a hard drive, a tape drive, a flash memory device, a solid state device, or the like. Infrastructure 110 may be logic, for example a storage controller, that controls access from fabric 106 to the storage devices mounted into the storage bays. Each of the plurality of storage enclosures has a unique storage enclosure ID stored in NVRAM in the infrastructure 110 that identifies the storage enclosure. Each storage device loaded into one of the storage bays in the storage enclosure has a unique serial number stored in the storage device.

In operation, the plurality of switches 108(k) control access between the servers 102(n) and the storage enclosures 104(i). The storage enclosure will typically assign a logical ID to each storage device, based in part on the storage enclosure's ID. Each of the plurality of servers may have access to all or only some of the storage devices loaded into each of the storage enclosures. The servers typically use the logical ID of the storage device when accessing the device. Zone groups are sets or lists of devices that can be accessed by other devices in a zone group. A zone group consisting of a server can be assigned access to a zone group consisting of storage devices. The storage devices in a zone group can span more than one storage enclosure. For example, a zone group may contain drive 1 and drive 2 in storage enclosure 104(1) and drive 3 in storage enclosure 104(2). One or more servers can be assigned to a zone group. Switches 108(k) maintain the zone groups as data in a zone group record. The zone group record is typically stored as one or more tables. The zone group record also contains the storage enclosure ID for each of the storage enclosures connected to the fabric.

In one example embodiment of the invention, a zone group record comprises a zone group permission table and an enclosure table. The zone group permission table lists the zone group name, the zone group number, and the zone group access. The zone group access is a list of other zone groups that have access to that zone group. An example zone group permission table is listed below.

| ZG Name | ZG Number | ZG Access |
|---|---|---|
| Special | 1 | All other ZGs |
| Initiator1 | 8 | 1, 8, 20 |
| Initiator2 | 9 | 1, 9, 21 |
| DiskGroup1 | 20 | 1, 20 |
| DiskGroup2 | 21 | 1, 21, 9 |

In some example embodiment of the invention, zone group number 1 may be a special zone group that allows access to all other zone groups. The enclosure table includes a storage enclosure entry for each storage enclosure coupled to the fabric. Each storage enclosure entry includes the storage enclosure ID, how many storage bays are in the storage enclosure, a product ID, a list of each of the storage bays, the zone groups assigned to each of the storage bays and the serial number of any storage device loaded into a storage bay. An example enclosure table with only one storage entry is listed below:

| Storage Enclosure Logical ID | 5001254562334456 |
| --- | --- |
| Number of Bays | 4 |
| Product ID | HP STORAGE ENCLOSURE |

| Bays | | | |
| --- | --- | --- | --- |
| Bay Number | Zone Group | Drive Present | Serial Number |
| 1 | 20 | YES | 1A20991244 |
| 2 | 20 | YES | 1A20991245 |
| 3 | 21 | NO | |
| 4 | 21 | YES | 1A20991246 |

When a storage enclosure fails it is taken offline and marked as such in the zone group record. All the storage devices from the failed storage enclosure are moved into a different storage enclosure. When the storage enclosure loaded with the old storage devices is attached to the fabric, the fabric will determine if the storage enclosure is a "new" storage enclosure. A "new" storage enclosure is a storage enclosure that has not been attached to the fabric before. The fabric can detect a new storage enclosure by comparing the storage enclosure's ID with the IDs of the storage enclosures saved in the zone group record.

When a "new" storage enclosure is added to a switch in the fabric, the switch can determine that it is a replacement storage enclosure. The switch uses the serial numbers from the storage devices currently loaded into the newly added storage enclosure and compares them with the set of serial numbers from any offline storage enclosures. When the two sets of serial numbers match, the "new" storage enclosure is a replacement for the failed/offline storage enclosure. Once a match between the two sets of serial numbers has been determined, all zone group information from the failed storage enclosure is copied to the newly added storage enclosure.

FIG. 2 is a flow chart for adding a storage enclosure to a fabric in an example embodiment of the invention. At step 202 when a storage enclosure is added/attached to one of the plurality of switches 108(k), the switch will detect the presence of the storage enclosure. The switch will retrieve the storage enclosure's ID. Using the storage enclosure's ID, the switch will determine if this is a "new" storage enclosure or one of the offline storage enclosures (step 204). When the storage enclosure is one of the offline storage enclosures, it will simply apply the old zone groups to this enclosure and will go back to the detection mode (step 202). When the storage enclosure is a new storage enclosure, flow will continue at step 206. At step 206 the switch will determine how many storage devices are loaded into the storage bays of the storage enclosure. The switch will then retrieve each of the storage device's serial number. At step 208 the switch will determine if there is a storage enclosure that has been taken offline. If no storage enclosures are offline, the switch will store the serial numbers of the storage devices along with the storage enclosure's ID and the storage device's logical IDs (step 210). When a storage enclosure is offline, the switch will compare the set of serial numbers from the storage devices in the offline storage enclosure with the serial numbers from the newly attached storage enclosure (step 212). When the two sets of serial numbers match it means that all the storage devices from the offline storage enclosure have been moved into the newly attached storage enclosure. Therefore the newly attached storage enclosure is a replacement storage enclosure for the offline storage enclosure. The switch will copy any zone groups assigned to the offline storage enclosure to the newly added storage enclosure (step 214).

The plurality of switches 108(k) may store the zone group information locally in their own non-volatile storage locations, or there may be a centrally located non-volatile storage location used by all the switches. When the zone group information is stored locally, the switches will communicate among themselves to determine when a replacement storage enclosure has been added. The switches can determine the serial numbers of the storage devices loaded into a storage enclosure using the INQUIRY command for SAS storage devices and the IDENTIFY DEVICE command for SATA storage devices. Because a replacement storage enclosure is determined from the serial numbers of the storage devices currently loaded into the storage enclosure, the replacement storage enclosure can be detected when it is connected to any one of the plurality of switches 108(k).

The storage devices in many storage enclosures are "hot pluggable", meaning that storage devices can be added or removed while the storage enclosure is online (i.e. powered up and running). When a storage device is added or removed from a storage enclosure while the storage enclosure is online, the switch that is coupled to the storage enclosure can detect that a change has occurred. When the switch detects a change, the switch will update the zone group information by either adding or removing the serial number for the storage device that was changed. In this way the set of storage device serial numbers will be kept up to date. If a new storage device is plugged in a storage enclosure and the storage enclosure is not zoned at all, that is, it does not have any storage devices that have been zoned before, the switch that the unzoned storage enclosure is attached to, will perform the comparison of the set of serial numbers of all the devices it has, including the newly added storage device, with the set of serial numbers of all the offline storage enclosures, and if a match is found, the zone groups from the off line storage enclosures will be copied over to the unzoned storage enclosure.

In one example embodiment of the invention, a signature will be stored and used to identify storage devices in a storage enclosure. In the above descriptions, the signature used was the set of serial numbers of the storage devices loaded into a storage enclosure. The serial number signature is created by retrieving each of the serial numbers from the drives loaded in the storage enclosure. In other example embodiments of the invention, other types of signatures may be used, such as some kind of hash of all the serial numbers. Another example would be to have a unique worldwide ID stored onto the storage device either during the manufacturing process or as an independent step before the storage device is loaded into a storage enclosure. The unique worldwide ID could replace the use of the storage device's serial number, or could be used in addition to the device's serial number.

What is claimed is:
1. A method for assigning zone groups to a physical storage enclosure, comprising:
   detecting when the physical storage enclosure is added to a fabric;
   creating a signature from each storage device in the physical storage enclosure;
   comparing the signature against the signature of a physical storage enclosure that is offline;
   when the created signature matches the signature of the offline storage enclosure, copying zone groups from the offline storage enclosure to the physical storage enclosure that was added to the fabric.

2. The method for assigning zone groups to a physical storage enclosure of claim 1, wherein the signature is based on the serial numbers of each of the storage devices in the physical storage enclosure.

3. The method for assigning zone groups to a physical storage enclosure of claim 1, wherein the fabric comprises at least one serial attached SCSI (SAS) switch.

4. The method for assigning zone groups to a physical storage enclosure of claim 1, wherein each of the storage devices in the physical storage enclosure is a storage device selected from the group: a hard disk drive, a tape drive, or a solid state device.

5. The method for assigning zone groups to a physical storage enclosure of claim 1, further comprising:
   when the new signature does not match the signature of the offline storage enclosure, storing a zone group record for the physical storage enclosure in a non-volatile storage location wherein the zone group record includes the signature of the new storage enclosure based on the storage devices loaded in it.

6. The method for assigning zone groups to a physical storage enclosure of claim 5, further comprising:
   detecting when a change is made to the storage devices in the physical storage enclosure and;
   updating the zone group record to reflect the change in storage devices.

7. The method for assigning zone groups to a physical storage enclosure of claim 5, further comprising:
   detecting when each storage device is assigned into a zone group;
   associating the zone group assignments with the signatures; and
   storing the zone group assignments in the non-volatile storage location.

8. A switch, comprising:
   a plurality of input ports and a plurality of output ports;
   logic for controlling access between the plurality of input ports and the plurality of output ports, the logic limiting access from the input ports to the output ports based on a zone group record;
   wherein the zone group record comprises:
      a list of input ports that are included in each zone group; and
      at least one storage enclosure record comprising:
         a storage enclosure logical ID;
         a listing of drive bays in the storage enclosure, the zone groups associated with each drive bay and a signature of a storage device loaded in each of the drive bays; and
   logic to, in response to detecting a new storage enclosure being coupled to one of the plurality of output ports;
      create a signature from each storage device loaded in the new storage enclosure;
      compare the signature of the new storage enclosure with the signature of an offline storage device: and
      copy all zone groups from the offline storage device to the new storage device if the new storage enclosure matches the signature of the offline storage device.

9. The switch of claim 8, wherein the switch is a serial attached SCSI (SAS) switch.

10. The switch of claim 8, further comprising:
    at least one storage enclosure coupled to at least one of the output ports;
    the logic detecting a change to a storage device loaded in the storage enclosure;
    in response to the detected change the logic updating the zone group record.

11. The switch of claim 10, wherein each of the storage devices loaded in at least one storage enclosure is a storage device selected from the group: a hard disk drive, a tape drive, or a solid state device.

12. A switch, comprising:
    a plurality of input ports and a plurality of output ports;
    means for controlling access between the plurality of input ports and the plurality of output ports, the means for controlling access limiting access from the input ports to the output ports based on a zone group record;
    wherein the zone group record comprises:
       a list of input ports that are included in each zone group; and
       at least one storage enclosure record comprising:
          a storage enclosure logical ID;
          a listing of drive bays in the storage enclosure, the zone groups associated with each drive bay and a signature of a storage device loaded in each of the drive bays; and
    means for, in response to detecting a new storage enclosure being coupled to one of the plurality of output ports:
       create a signature from each storage device loaded in the new storage enclosure;
       compare the signature of the new storage enclosure with the signature of an offline storage device: and
       copy all zone groups from the offline storage device to the new storage device if the new storage enclosure matches the signature of the offline storage device.

13. The method of claim 1, in which the signature is based on a hash of each of the serial numbers of each of the storage devices in the physical storage enclosure.

14. The method of claim 1, in which the signature is created based on a unique worldwide ID stored onto a number of storage devices in the storage enclosure.

* * * * *

UNITED STATES PATENT AND TRADEMARK OFFICE
CERTIFICATE OF CORRECTION

PATENT NO. : 9,069,470 B2  
APPLICATION NO. : 13/078449  
DATED : June 30, 2015  
INVENTOR(S) : Michael G. Myrah et al.

Page 1 of 1

It is certified that error appears in the above-identified patent and that said Letters Patent is hereby corrected as shown below:

In The Claims

In column 5, line 53, in Claim 8, delete "ports;" and insert -- ports: --, therefor.

In column 6, line 4, in Claim 8, delete "device:" and insert -- device; --, therefor.

In column 6, line 43 approx., in Claim 12, delete "device:" and insert -- device; --, therefor.

Signed and Sealed this  
Ninth Day of February, 2016

Michelle K. Lee  
*Director of the United States Patent and Trademark Office*